United States Patent
Austen

[15] 3,688,883
[45] Sept. 5, 1972

[54] SYNCHRONIZING RING

[72] Inventor: Jürg Austen, Weinsberg, Germany

[73] Assignee: Firma Dr. -Ing. h.c.F. Porsche K.G., Stuttgart-Zuffenhausen, Germany

[22] Filed: April 26, 1971

[21] Appl. No.: 137,468

[52] U.S. Cl. ............................................. 192/53 C
[51] Int. Cl. ................................................ F16d 23/02
[58] Field of Search ........................ 192/53 A, 53 C

[56] References Cited

UNITED STATES PATENTS

| | | |
|---|---|---|
| 3,152,676 | 10/1964 | Mandlinger et al. .. 192/53 C X |
| 3,200,920 | 8/1965 | Reich ..................... 192/53 C |
| 3,504,775 | 4/1970 | Reich et al. ............. 192/53 C |

*Primary Examiner*—Allan D. Herrmann
*Attorney*—Craig, Antonelli & Hill

[57] ABSTRACT

A synchronization installation for change-speed transmissions, especially for motor vehicles, which contains a slotted and spingy synchronizing ring, which is oval in shape in the unstressed condition, whereby its larger dimension is disposed in a plane perpendicular to the plane of the ring ends; the ring areas on both sides of the plane extending through the ring ends of the synchronizing ring thereby possess diameters that differ from one another.

7 Claims, 3 Drawing Figures

PATENTED SEP 5 1972

3,688,883

*Inventor:*
JORG AUSTEN
BY *Craig, Antonelli, Stewart & Hill*
ATTORNEYS

SYNCHRONIZING RING

The present invention relates to a synchronization installation for change-speed transmission, especially for motor vehicles, which includes a slotted and springy synchronizing ring which, in the unstressed condition, is oval whereby its larger dimension is located in the plane disposed perpendicular to the plane of the ring ends.

The purpose of the present invention is the adaptation of the synchronizing ring to the asymmetrical loads during the synchronization work.

In synchronizing devices for change-speed transmissions of the aforementioned type, the rotational speed differences to be matched between the shifting-up and the shifting-down operation of the transmission cause an asymmetric loading and stressing of the synchronizing ring which necessarily has as a consequence an uneven wear of its friction surfaces. In order to avoid these shortcomings, it has already been proposed to coordinate to the synchronizing ring a blocking body which is retained with different angles of attack in the hub of the clutch body of the gear wheel to be engaged (German Pat. No. 1,013,178). During the synchronization work, with the aid of tongues at the blocking body, the one or other ring end is pressed corresponding to the synchronizing work to be produced against the friction surface at the shifting sleeve. These measures are meaningful if one can dispense with the cooperation of means increasing the servo-effect. In constructions with servo-assists by means of blocking bands which engage at the inner circumference of the synchronizing ring, the use of an ovally shaped synchronizing ring has proved itself particularly advantageous (German Pat. No. 1,158,375). However, it is disadvantageous that for the engagement of the starting speed from the standstill of the of the vehicle, special measures have to be taken at the clutch body and at the displaceable abutment (compare "Motorrundschau" No. 21/1958, page 375), which not only causes additional machining and manufacturing costs, but also results in only conditionally satisfactory shifting results.

In contradistinction thereto, the purpose of the present invention resides in avoiding the additional expenditures for the starting speed and simultaneously to avoid a hooking of the synchronizing installation as a result of an excessive blocking effect.

According to the present invention, the underlying problems are solved in that the ring areas on both sides of the plane extending through the ring ends of the synchronizing ring have diameters differing from one another. The arrangement is preferably selected in such a manner that the ring area of the synchronizing ring which serves for the shifting-up, has a larger diameter than the ring area which is required for the shifting-down operation. One of the two ring areas of the synchronizing ring is advantageously provided with a mark for the differentiation of its installation position. The marking is provided within the area of one of the ring ends of the synchronizing ring and for the sake of simplicity may consist of the manufacturer's mark.

A treatment of the clutch body of the gear wheel to be engaged, which concerns exclusively the starting speed, can be dispensed with by the construction of the synchronizing ring characterized by the features of the present invention. Furthermore, one can also dispense with a special slide member or ring that is complicated to manufacture, so that one obtains a far-reachingly symmetrical construction of the synchronization installation for all speeds of the transmission. Also, the storing of spare parts and assembly is facilitated. As sole assembly instructions, one has to pay attention to the predetermined position of the synchronizing ring which can be immediately mastered also by unskilled personnel due to the presence of the manufacturer's mark which would normally be provided anyhow.

These and further objects, features and advantages of the present invention will become more apparent from the following description when taken in connection with the accompanying drawing which shows, for purposes of illustration only, one embodiment in accordance with the present invention, and wherein.

Figure 1:
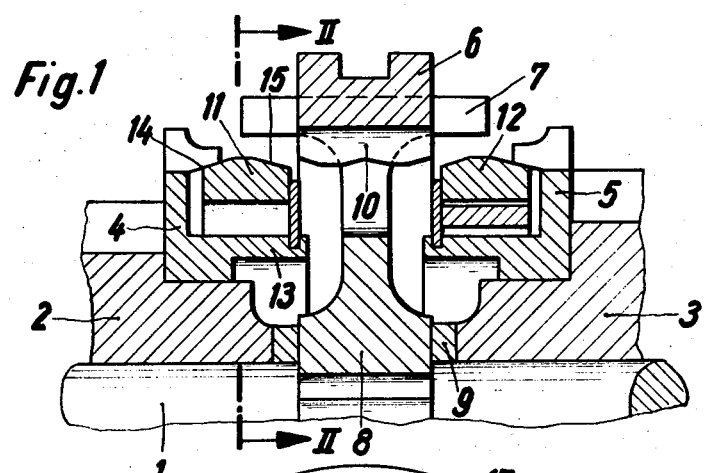
FIG. 1 is a partial cross-sectional view through the synchronization installation for the shifting sleeve transmission of a motor vehicle with a synchronizing ring according to the present invention.
Figure 2:
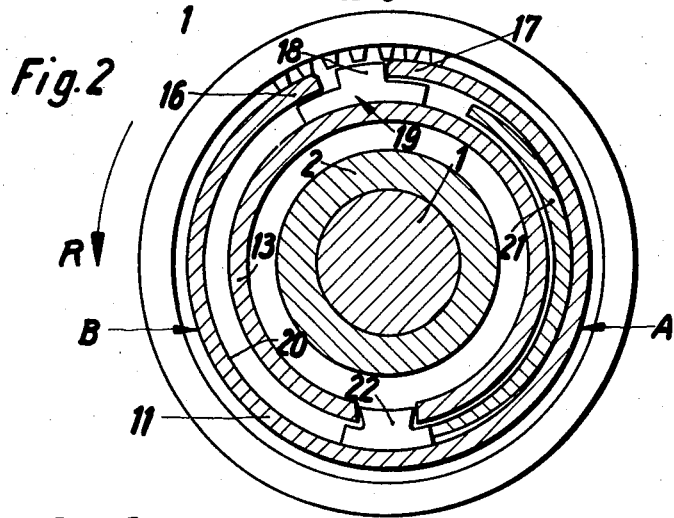
FIG. 2 is a transverse cross-sectional view through the synchronizing installation of the starting speed taken along line II—II of FIG. 1.
Figure 3:
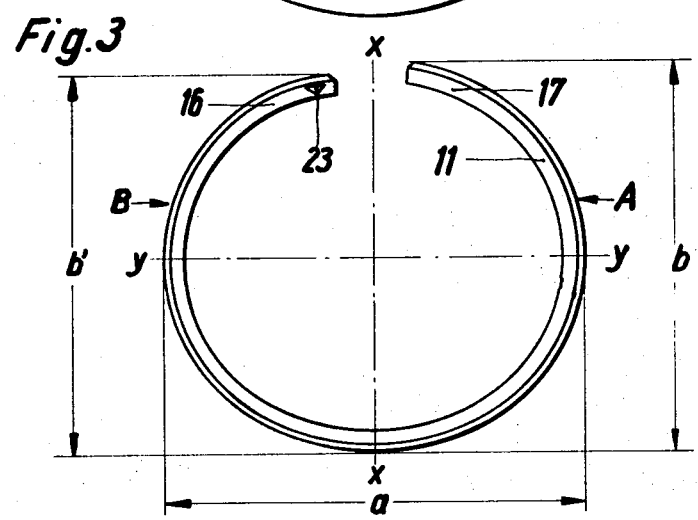
FIG. 3 is an elevational view of the unstressed synchronizing ring according to FIG. 2.

Referring now to the drawing wherein like reference numerals are used throughout the various views to designate like parts, and more particularly to FIG. 1, in the transmission portion illustrated in this figure, gear wheels 2 and Figure, are rotatably but longitudinally non-displaceably mounted on a transmission shaft 1 indicated only in part. The gear wheels 2 and 3 are in constant meshing engagement with gear wheels mounted on a further transmission shaft and are provided with clutch bodies 4 and 5. The clutch bodies 4 and 5 are adapted to be clutched with a shifting sleeve 6 which is axially displaceably retained on webs 7 of a shifting sleeve carrier 8. The shifting sleeve carrier 8 is non-rotatably connected with the transmission shaft 1 to rotate in unison therewith and is secured axially between abutment disks 9. The head surfaces of the teeth 10 of the shifting sleeve 6 cooperate with synchronizing rings 11 and 12 which are arranged on a respective hub portion 13 of the coupling bodies 4 and 5, respectively. Each of the synchronizing rings 11 and 12 is provided with a centering surface 14 and a friction surface 15. The nose portion 18 (FIG. 2) of a sliding member generally designated by reference numeral 19 projects between the ends 16 and 17 of the synchronizing ring 11, the sliding member 19 being retained on the hub 13 of the clutch body 4, so as to be displaceable in the circumferential direction. A blocking band 21 is arranged between the hub 13 and the inner surface 20 of the synchronizing ring 11 within the annular area A which serves the shifting during the drive; the blocking band 21 is supported against an abutment 22. The abutment 22 is fixedly arranged in the hub 13 of the clutch body 4. The synchronization work from the standstill of the vehicle is realized by the annular area B of the synchronizing ring 11 on the other side of a plane X—X disposed through the ring ends 16 and 17. Since no blocking work is necessitated for that purpose, a blocking band may be dispensed with on this side of the synchronization installation. In the unstressed condition (FIG. 3), the synchronizing ring 11 which has the same cross section over its entire circumference is oval with the large diameter *a* in a plane Y—Y that extends perpendicular to the plane X—X. The diameter *b* of the area A of the synchronizing ring 11 is larger than the diameter *b'* of the area B of the synchronizing ring. This has as a consequence that the ring area A abuts flush at the friction surfaces of the teeth 10 of the shifting sleeve 6 during the synchronization work whereas the ring area B at least near the ring end 16 thereof does not produce any blocking effect with respect to the shifting sleeve. Since the deviation of the two diameters *b* and *b'* necessary therefor is relatively slight and is not visible with the naked eye, a mark 23, for example, in the form of the manufacturer's trademark, is applied at the ring end 16 for the determination of the correct assembly position of the synchronizing ring.

During the assembly of the synchronizing installation, one has to pay attention that the ring area B which contains the mark 23 comes to lie in the circumferential direction R which corresponds to the starting speed, i.e., to the shifting with a vehicle at standstill. If, in this installed position, the shifting sleeve 6 is displaced toward the left in relation to the drawing of FIG. 1, then the friction surfaces of the teeth 10 of the shifting sleeve 6 come into frictional engagement with the friction surface 15 of the synchronizing ring 11 and take the synchronizing ring 11 along in the circumferential direction R. Due to the described configuration and due to the absence of a blocking band, the synchronizing ring 11 exerts only such a friction force at the shifting sleeve 6 as is necessitated for braking the gear wheel 2. As a result thereof, the starting speed can be engaged with slight shifting force and without scratching or hooking. During the shifting, when driving, i.e., from second into first speed, the gear wheel has to be accelerated opposite the circumferential direction R. The full blocking and servo-effect is necessitated therefor which is assured by the known operation of the synchronizing ring in conjunction with the blocking band 21.

The present invention is not limited to the described embodiment. Thus, for example, for change-speed transmissions, which are subjected to lesser loads, all of the speeds may be constructed in the manner described herein whereby one can attain a completely symmetrical construction of the synchronization installation for the entire transmission.

While I have shown and described only one embodiment in accordance with the present invention, it is understood that the same is not limited thereto, but is susceptible of numerous changes and modifications as known to those skilled in the art and I, therefore, do not wish to be limited to the details shown and described herein, but intend to cover all such changes and modifications as are encompassed by the scope of the appended claims.

I claim:

1. A synchronization installation for change-speed transmissions, especially for motor vehicles, comprising a slotted and springy synchronizing ring means having an essentially oval shape in the unstressed condition, whereby its larger dimension is disposed in a plane substantially perpendicular to the plane through the ring ends, characterized in that the ring areas on both sides of said plane extending through the ring ends of the synchronizing ring means have diameters different from one another.

2. A synchronization installation according to claim 1, characterized in that the ring area of the synchronizing ring means which serves for the shifting-up operation has a larger diamter than the diameter of the ring area which serves for the shifting-down operation.

3. A synchronization installation according to claim 2, characterized in that one of the ring areas of the synchronizing ring means is provided with a marking for indicating its correct assembly position.

4. A synchronization installation according to claim 3, characterized in that the marking is applied within the area of one of the ring ends of the synchronizing ring means.

5. A synchronization installation according to claim 4, characterized in that the marking essentially consists of the manufacturer's mark.

6. A synchronization installation according to claim 1, characterized in that one of the ring areas of the synchronizing ring means is provided with a marking for indicating its correct assembly position.

7. A synchronization installation according to claim 6, characterized in that the marking is applied within the area of one of the ring ends of the synchronizing ring means.

* * * * *